Patented Nov. 14, 1950

2,529,681

UNITED STATES PATENT OFFICE 2,529,681

FUSED DDT COMPOSITIONS CONTAINING AN ABSORBENT INERT

Albert L. Flenner, Wilmington, Del., assignor to E. I. du Pont de Nemours & Company, Wilmington, Del., a corporation of Delaware No Drawing. Application March 30, 1945, Serial No. 585,801

5 Claims. (Cl. 167—42)

1

This invention relates to methods and compositions and is particularly directed to new methods for preparing finely divided compositions containing a product commonly called DDT which is made up largely or wholly of 2,2-bis-(parachlorphenyl) 1,1,1-trichloroethane, and to the compositions so prepared.

It has recently been discovered that DDT is outstandingly effective for the control of certain insect pests and many formulations and methods of formulating the material for this purpose have been suggested. The physical properties of the material, however, are such that the methods heretofore available for preparing finely divided compositions containing DDT have been complicated and expensive and have not been well adapted to the production of a product containing a high proportion of DDT.

It is an object of the invention to provide improved methods for preparing finely divided compositions containing DDT. It is an object of the invention to provide methods readily adapted to preparing finely divided compositions containing DDT in high concentrations. It is a further object of the invention to provide improved finely divided compositions containing DDT. It is a further object of the invention to avoid difficulties of the prior art and to obtain advantages as will become apparent as the description proceeds.

DDT is prepared by the condensation of chloral and monochlorobenzene by means of sulfuric acid. The product thus obtained is made up largely of 2,2-bis(parachlorphenyl) 1,1,1-trichloroethane and a smaller quantity of other condensation products, principally the ortho-para isomer. The crude product has an indefinite melting point while the recrystallized product has a melting point of about 107–108° C. Both the pure and the crude DDT, especially the crude, have a strong tendency to supercool. Both products, especially the crude, are difficult to comminute and under the influence of milling are likely to become gummy and tacky. It has been necessary, therefore, in comminuting the material to utilize a large proportion (about 90%) of inert or to employ refrigeration or other complicated and expensive processing in order to obviate balling up of the product in the comminution apparatus.

The objects set forth above are accomplished and the disadvantages enumerated are avoided in the present invention, typical embodiments of which are illustrated in the following examples in which the parts are by weight unless otherwise specified.

Example 1

(a) 300 parts of DDT having a set point of 90.5° C. was fused and heated to 110° C. in a glass vessel. 300 parts of fuller's earth having a particle size of from 10 to 40 microns was heated to 90° C. in a glass vessel. The fused DDT was then poured into the heated fuller's earth in a fine stream while stirring constantly. After all the DDT had been thus added, the mixture was kept at 90–95° C. for 10 minutes while being stirred constantly. The well-mixed product was a dry powder even when hot.

(b) 1 part of the product was ground in a hammer mill to give a dry, free-flowing powder having a particle size ranging from less than 1 micron to 20 microns and averaging about 10 microns.

(c) Another part was ground in a hammer mill four times to give a product ranging in particle size from less than 1 micron to 15 microns and averaging about 7.5 microns.

(d) A third portion was ground in a Micronizing[1] mill and a very fine dry powder was obtained having a particle size ranging from less than 1 micron to 7 microns and averaging 3 microns.

The above compositions a, b, c, and d are all suitable for use as insecticides for controlling various insect pests and are uniquely characterized in that the particles are coated with DDT which has crystallized out on the surface and in the pores of the inert particles from supercooled DDT. Particles are not just coated. Otherwise any small particle inert would suffice. The DDT is absorbed in porous inert and when particles are broken up, all surfaces contain DDT.

The product (d) has been found unusually toxic against certain insects; for example, product (d) is outstandingly effective against Southern Army worm. Products (b) and (c) are also effective but less so, and quite surprisingly product (a) is markedly less effective.

In place of fuller's earth there may be substituted other highly absorbent inerts such as tricalcium phosphate, celite, or a 50–50 mixture of celite and talc, or any other inert material that is compatible with DDT, which is highly absorptive for DDT and which has a particle size not substantially over 50 microns and is either much

---

[1] Micronizing is a trade name for a non-mechanical pulverizing process in which the particles are abraded one upon the other by means of a high velocity air stream.

finer or capable of being ground to a much finer particle size.

Example 2

(a) A lot of fuller's earth having a particle size ranging from 10 to 40 microns was ground in a Micronizing mill to a particle size of less than 1 micron to 10 microns. 300 parts of DDT having a set point of 90.5° C. was fused and mixed with 300 parts of the microzined fuller's earth exactly as in Example 1. The product was obtained as a fine, dry powder.

(b) A proportion of the product was ground once in a hammer mill to give powder having a particle size ranging from less than 1 micron to 12 microns and averaging about 5 microns. Grinding four times in the hammer mill did not cause any appreciable change in the particle size over that effected by grinding once.

(c) Another proportion was ground once in a Micronizing mill and a very fine, dry powder was obtained having a particle size ranging from less than 1 micron to 7 microns and averaging about 3 microns.

All of the compositions (a), (b), and (c) are useful for the control of insects and the process has the advantage that a very finely divided product is obtained with very little subsequent milling and that such milling may be effected in mechanical mills and yet give products of unusually small average particle size.

Other inerts as described in Example 1 may be substituted for fuller's earth.

The compositions of Example 2 also are uniquely characterized in that the particles of the inert have absorbed DDT which has crystallized from supercooled DDT.

The compositions of Examples 1 and 2 may be utilized as such or they may be diluted with other inerts to form dusting compositions. For example, suitable dusting compositions may be prepared by diluting the compositions of Examples 1 and 2 with talc or other suitable dusting powders, such as gypsum, clays, pyrophyllite, diatomaceous earth, etc. They may also be mixed with wetting and dispersing agents to provide water-dispersible powders. For example, in the compositions of Examples 1 and 2 we have incorporated therein suitably in the mixing operation a small amount of goulac and IN-181 (technical sodium n-dodecyl sulfate) to give the following composition:

|  | Percent |
| --- | --- |
| DDT | 49 |
| Fuller's earth | 49 |
| Goulac | 1 |
| IN-181 | 1 |

In this composition the 98% DDT and fuller's earth may be replaced by a more dilute product such as 25% DDT, 25% fuller's earth, and 48% Homer clay.

In place of goulac there may be substituted other dispersing and deflocculating agents as sulfonates of formaldehyde-naphthylene condensation products, and in place of IN-181 there may be substituted a wide variety of wetting agents including higher alcohols, soaps, higher alcohol sulfates, long-chain onium compounds, and mineral oil sulfonates.

The compositions of Examples 1 and 2 may also be modified by the inclusion of a hydrophobic material which will make the particles water repellant so they will float on the surface of water. This may be effected by including in the milling or fusing steps a small amount, say, up to about 2%, of suitable hydrophobic materials such as stearylamine and other higher aliphatic amines, stearic acid, water-insoluble fatty acids and other water-insoluble derivatives of water-insoluble fatty acids including water-insoluble soaps and their natural fats and waxes and other natural hydrophobic agents such as rosin and rosin derivatives, including rosin residue and rosin soaps, and hydrocarbons such as Asiatic wax and paraffin wax, as well as synthetic hydrophobic materials such as long-chain isocyanates and isothiocyanates (U. S. Patent 2,284,895), decomposition products of quaternary stearimido compounds (U. S. Patent 2,278,417), stearato-chromic chloride and methyl chlorosilicane.

In carrying out the processes of the invention, it is desirable to maintain the temperature above the fusion temperature of the DDT. Thus it is desirable to heat the inert material sufficiently that the temperature during the milling does not fall below the fusion temperature of DDT. In the broader aspects of the invention, however, it will be understood that lower temperatures may be utilized in view of the strong tendency of the DDT to supercool. Thus it is within the scope of the invention to fuse the DDT at any temperature ranging from the fusion temperature to the decomposition temperature for the particular DDT involved and mixing it with the inert even at ordinary room temperature. The tendency of the DDT to supercool is so strong that even in such cases the DDT remains sufficiently fluid to disperse on the particles of the inert during the mixing or blending operation. It is generally desirable, however, to effect the mixing or blending at a temperature above the fusion temperature of the DDT but not substantially above 110° C. At the higher temperatures the DDT is more fluid and is more easily and effectively distributed on the surfaces of the inert particles. Also danger of crystallization during the blending operation is wholly avoided.

The mixing and blending may be effected in any suitable mixing apparatus. The usual dough mixers or sigma-arm mixers provided with a steam jacket or temperature control are admirably suited to mixing the fused DDT on the inert. Such a mixer is charged with the inert and the fused DDT is fed in slowly so that the mix remains dry throughout the mixing operation. The better the distribution of the fused DDT or the more slowly it is introduced, the more uniform the product and the less milling required to break up agglomerates. The fused DDT may be introduced in any suitable quantity up to about one part for each part of inert. If the processes of the invention, however, are particularly suited to producing concentrated materials, the quantity of DDT will ordinarily be maintained at the maximum consistent with the absorptivity of the inert. With such highly absorbent materials as fuller's earth, celite, and tricalcium phosphate, DDT may constitute as much as 50% or more of the composition, whereas with less absorptive inerts the proportion of DDT must be reduced.

In carrying out the processes of the invention, the inert material should be pre-milled to a particle size less than about 50 microns. This ordinarily will be done by the supplier of the inert and many grades of the different inerts are available on the open market having a particle size less than 50 microns. Any of the commercially available inert materials are sold in insecticide grades which ordinarily will run about 325 mesh, with the particles ranging from 10 to 40 microns.

Such a material is suitable but for maximum toxic properties is much too coarse and needs to be further reduced either before or after it is fused with DDT. If it is reduced to a suitable particle size first, a satisfactory product may be obtained directly in the fusion step, particularly where the addition of the fused DDT to the mixer is carefully made and attrition in the mixture is sufficient to break up agglomerates or to prevent tendency of the material to agglomerate.

While I have described my invention with reference to particular embodiments, I do not intend that the invention is to be limited to any of the particular details thereof but that variation may be made without departing from the spirit and scope of the invention.

I claim:

1. The method which comprises heating DDT to a temperature above fusion but below about 110° C. and gradually feeding the fused DDT, in proportions to give a dry product, into a mass of a finely divided absorbent inert solid powder while maintaining the temperature of the absorbent powder above the fusion temperature of DDT but below 110° C. and while stirring the powder to effect a mixture of the fused material and the absorbent powder, the rate of addition of the fused DDT into the absorbent powder being controlled so that the mixture remains as an apparently dry powdered solid thruout the addition and mixing operation.

2. The method which comprises fusing DDT and gradually feeding the fused DDT, in proportions to give a dry product, into a mass of a finely divided absorbent inert solid powder having a particle size less than about 50 microns while maintaining the temperature of the absorbent powder above the fusion temperature of DDT but below 110° C. and while stirring the powder to effect a mixture of the fused material and the absorbent powder, the rate of addition of the fused DDT into the absorbent powder being controlled so that the mixture remains as an apparently dry powdered solid thruout the addition and mixing operation.

3. The method of claim 1 in which the finely divided absorbent inert solid powder is fuller's earth.

4. The method of claim 1 in which the finely divided absorbent inert solid powder is diatomaceous earth.

5. The method of claim 1 in which the finely divided absorbent inert solid powder is tricalcium phosphate.

ALBERT L. FLENNER.

REFERENCES CITED

The following references are of record in the file of this patent:

UNITED STATES PATENTS

| Number | Name | Date |
| --- | --- | --- |
| 1,550,650 | Banks | Aug. 18, 1925 |
| 2,145,259 | Heath | Jan. 31, 1939 |
| 2,346,362 | Dolman | Apr. 11, 1944 |
| 2,349,814 | Deonier et al. | May 30, 1944 |
| 2,423,457 | Lynn et al. | July 8, 1947 |

FOREIGN PATENTS

| Number | Country | Date |
| --- | --- | --- |
| 547,874 | Great Britain | Sept. 15, 1942 |

OTHER REFERENCES

Ind. and Eng. Chem., April 1942, pages 491–3 by Smith et al. (Copy in Patent Office Library.)